(No Model.) 7 Sheets—Sheet 1.
P. BLACHE.
MACHINE FOR MAKING CIGARETTE MOUTHPIECES.
No. 493,472. Patented Mar. 14, 1893.
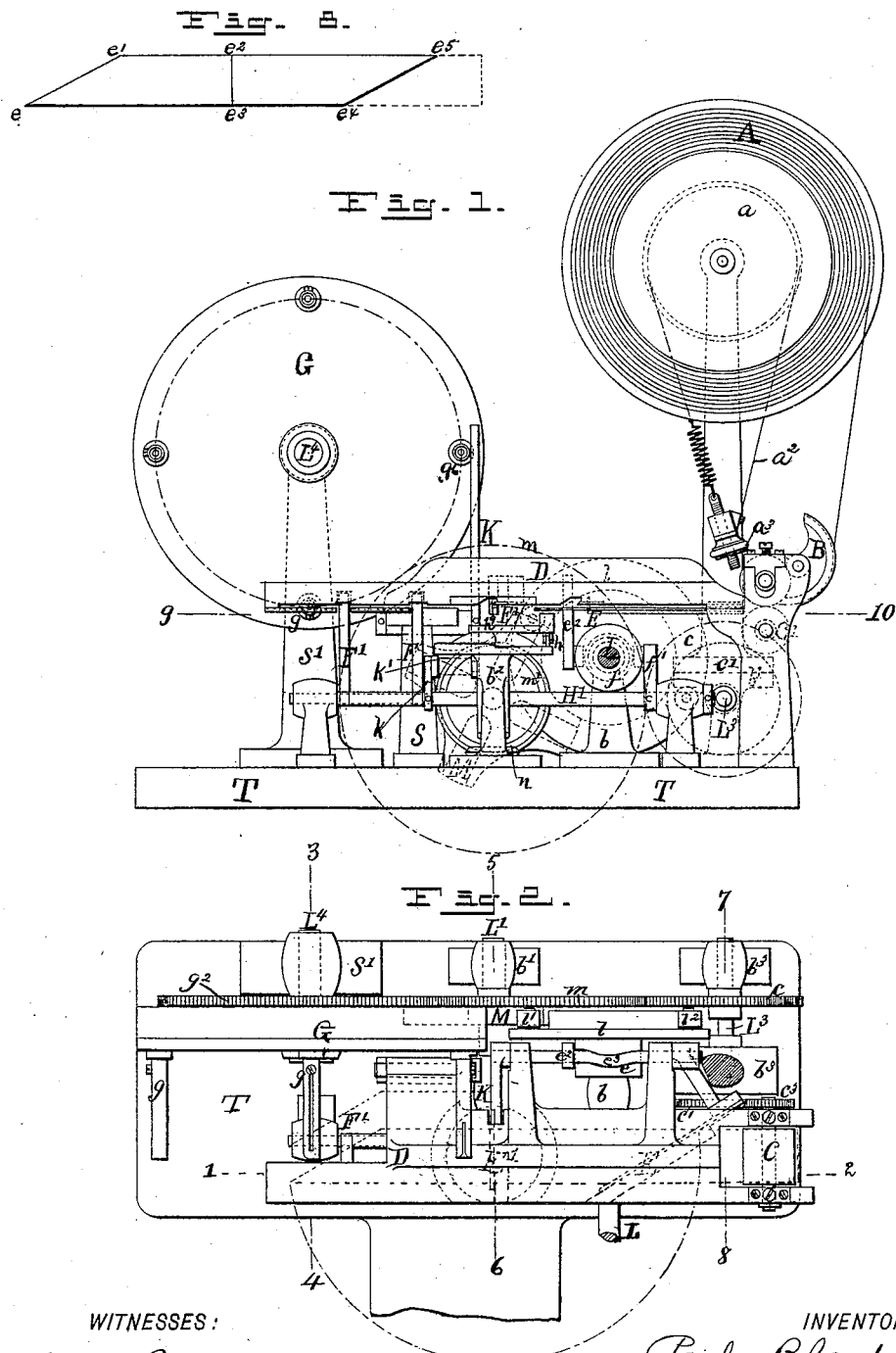
WITNESSES:
John Revell
George Baumann
INVENTOR
Paul Blache
BY
Howson and Howson
his ATTORNEYS (No Model.) 7 Sheets—Sheet 2.
P. BLACHE.
MACHINE FOR MAKING CIGARETTE MOUTHPIECES.
No. 493,472. Patented Mar. 14, 1893.
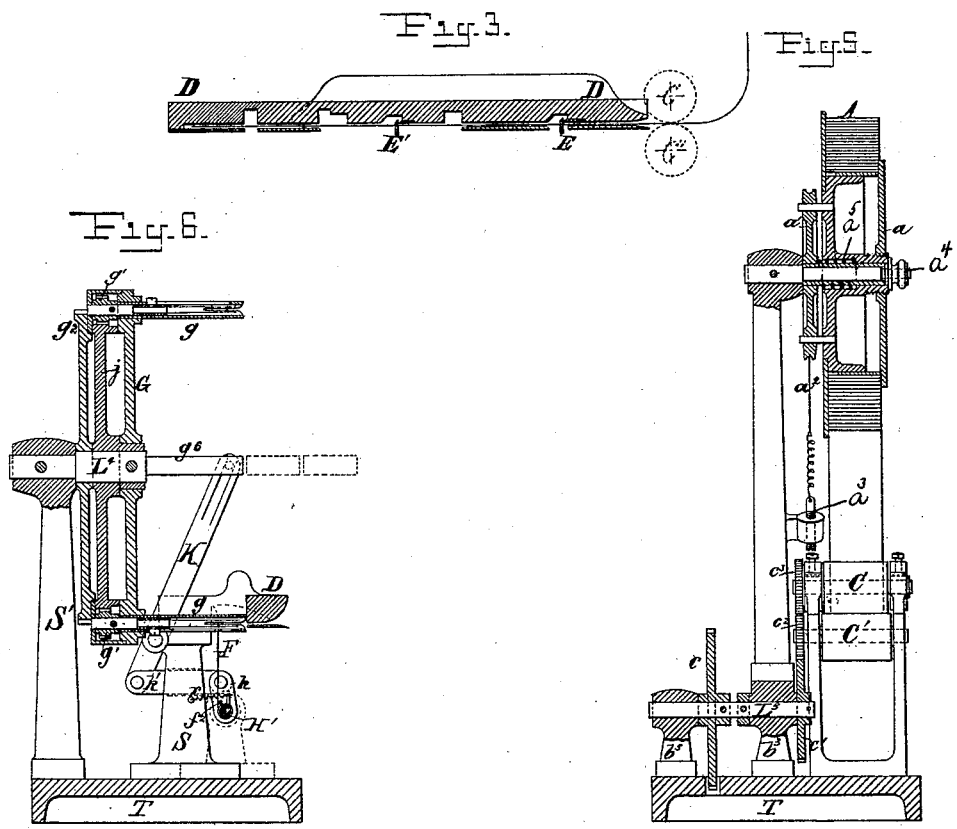
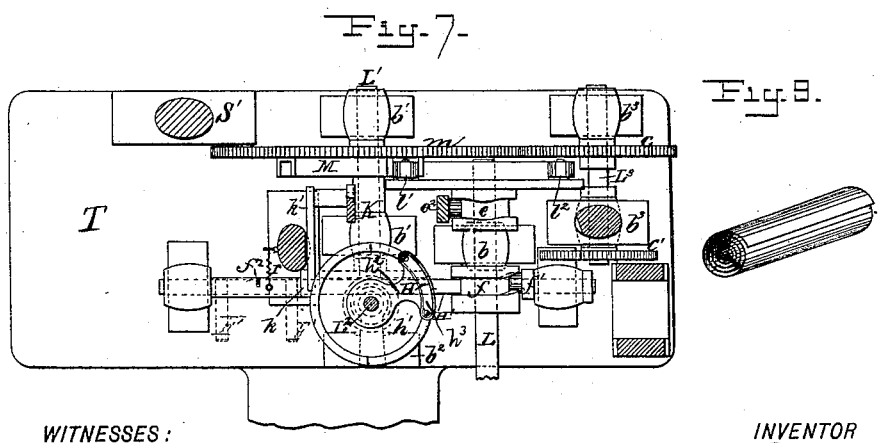
WITNESSES:
George Baumann
John Revell
INVENTOR
Paul Blache
BY
Howson and Howson
his ATTORNEYS.

(No Model.) 7 Sheets—Sheet 3.
P. BLACHE.
MACHINE FOR MAKING CIGARETTE MOUTHPIECES.
No. 493,472. Patented Mar. 14, 1893.
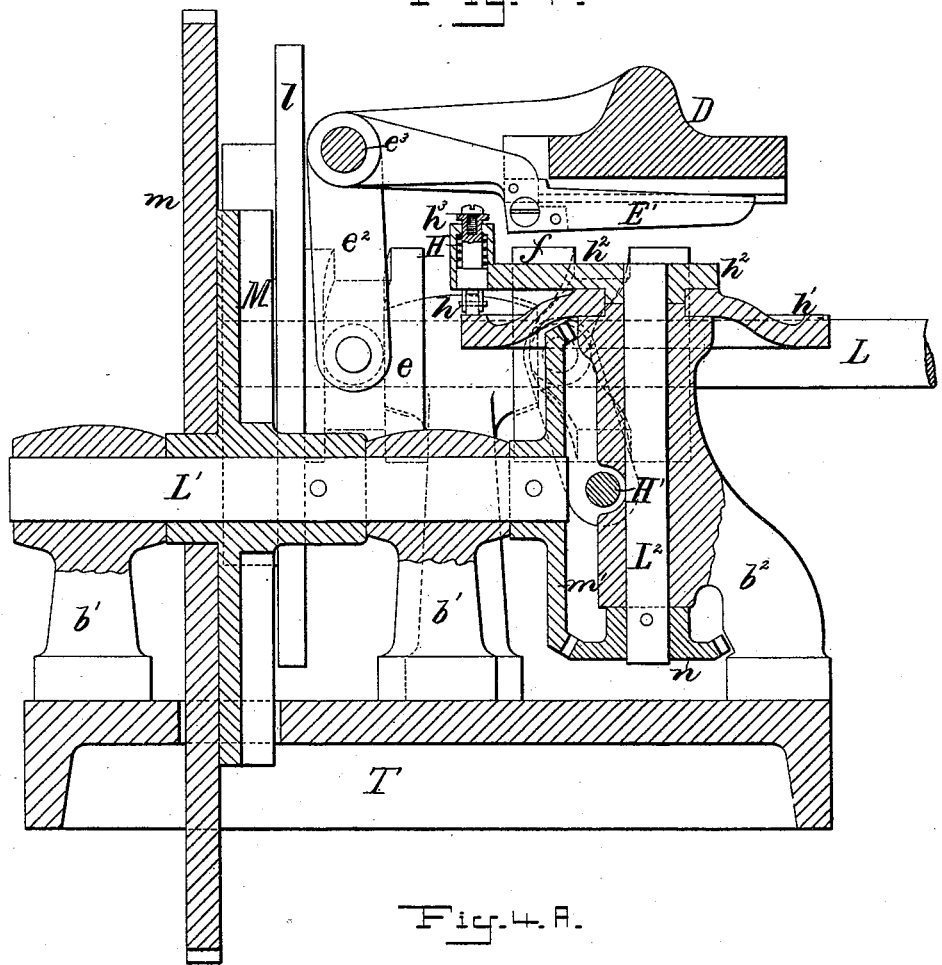
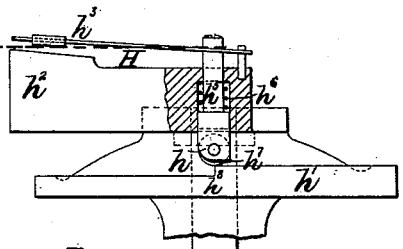
WITNESSES:
George Baumann
James Gracie
INVENTOR:
Paul Blache
BY
Howson & Howson
ATTORNEYS.

(No Model.) 7 Sheets—Sheet 4.
P. BLACHE.
MACHINE FOR MAKING CIGARETTE MOUTHPIECES.

No. 493,472. Patented Mar. 14, 1893.

WITNESSES:
George Baumann
James Gracie

INVENTOR:
Paul Blache
BY
Howson T Howson
ATTORNEYS.

(No Model.) 7 Sheets—Sheet 5.
P. BLACHE.
MACHINE FOR MAKING CIGARETTE MOUTHPIECES.

No. 493,472. Patented Mar. 14, 1893.

WITNESSES:
James Gracer
Sarah C. Connor

INVENTOR
Paul Blache
BY
Howson and Howson
his ATTORNEY.

(No Model.) 7 Sheets—Sheet 6.
P. BLACHE.
MACHINE FOR MAKING CIGARETTE MOUTHPIECES.
No. 493,472. Patented Mar. 14, 1893.
Fig. 12.
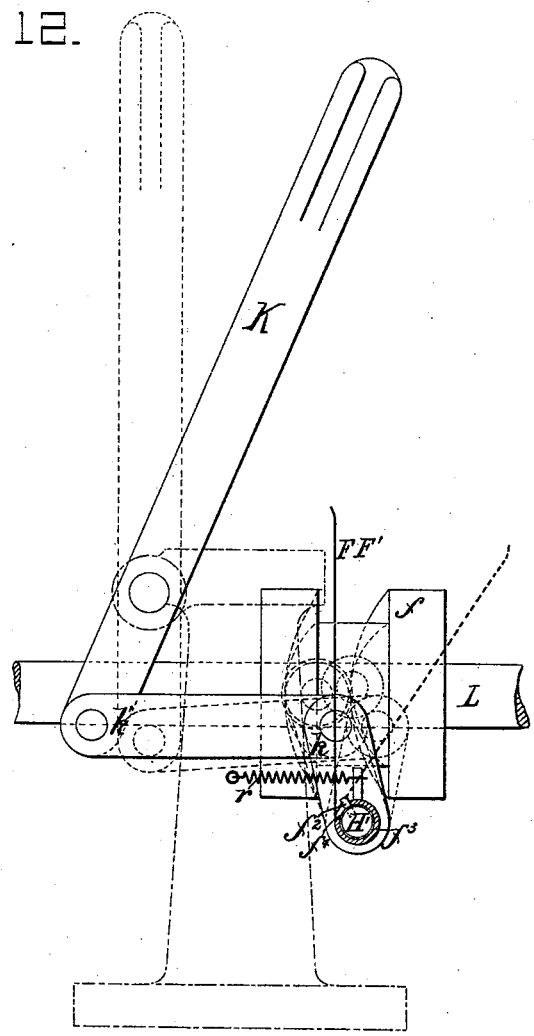
Fig. 10.B.
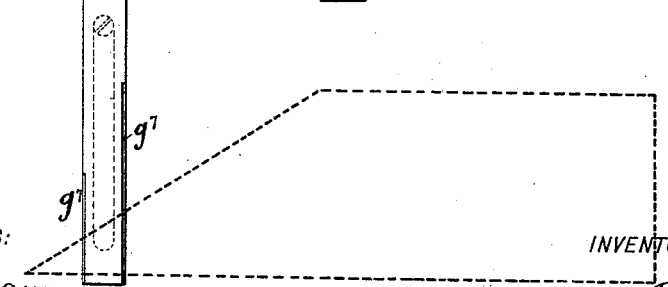
WITNESSES: George Baumann, James Gracie
INVENTOR: Paul Blache
BY Howson & Howson
ATTORNEYS.

(No Model.) 7 Sheets—Sheet 7.
P. BLACHE.
MACHINE FOR MAKING CIGARETTE MOUTHPIECES.

No. 493,472. Patented Mar. 14, 1893.

WITNESSES:
James Gracie
Sarah C. Connor

INVENTOR
Paul Blache
BY
Howson and Howson
his ATTORNEY.

UNITED STATES PATENT OFFICE.

PAUL BLACHE, OF PARIS, FRANCE.

MACHINE FOR MAKING CIGARETTE-MOUTHPIECES.

SPECIFICATION forming part of Letters Patent No. 493,472, dated March 14, 1893.

Application filed October 6, 1891. Serial No. 407,885. (No model.) Patented in France February 2, 1891, No. 211,109, and in Austria-Hungary December 29, 1891, No. 43,071.

*To all whom it may concern:*

Be it known that I, PAUL BLACHE, engineer, a citizen of the Republic of France, residing at Paris, France, have invented an Improved Machine for Making Cigarette-Mouthpieces, (for which I have obtained Letters Patent in France, No. 211,109, dated February 2, 1891, and in Austria-Hungary, No. 43,071, dated December 29, 1891,) of which the following is a specification.

This invention has for its object the mechanical manufacture of paper mouth pieces and their introduction into cigarettes. The machine which I have invented for this purpose offers the advantage of cutting the mouth pieces for bobbin or rolls of paper and of using them in suchwise that the whole of the paper of the bobbins is utilized.

Figure 10A:
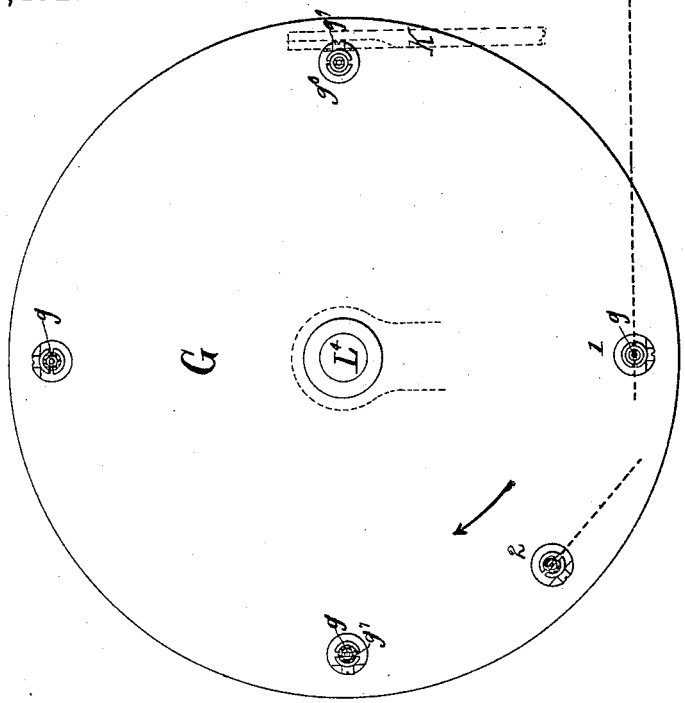
Figure 10:
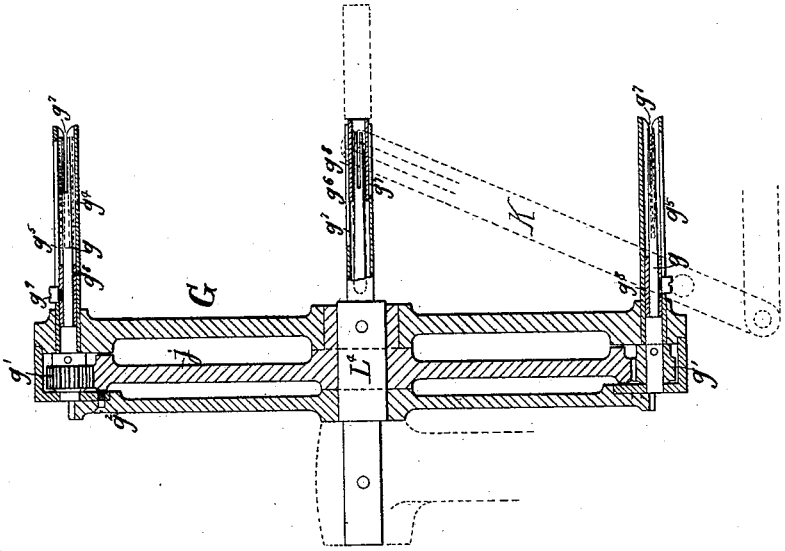
Figure 11:
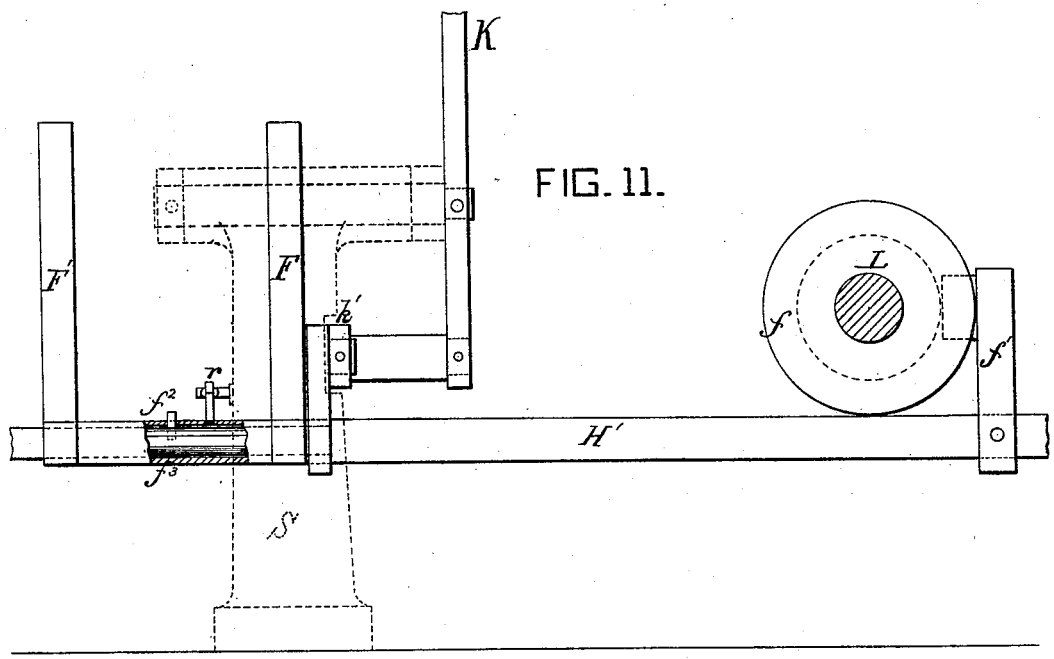
Figure 13:
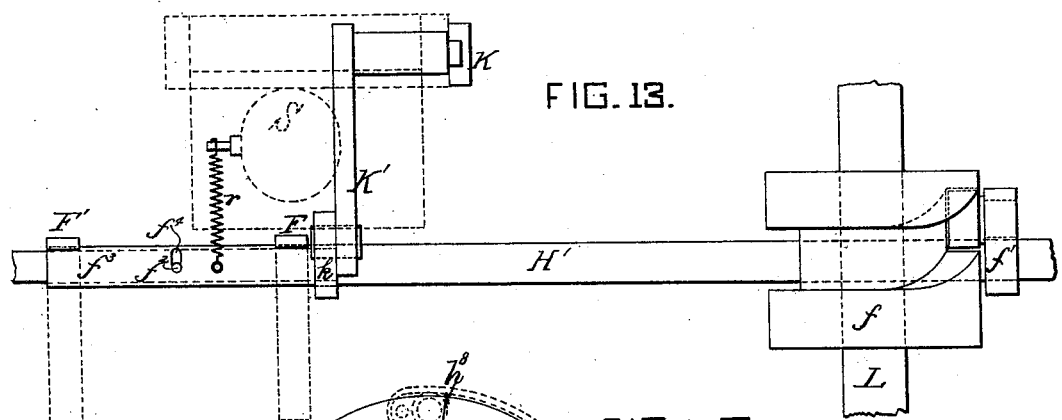
Figure 4B:
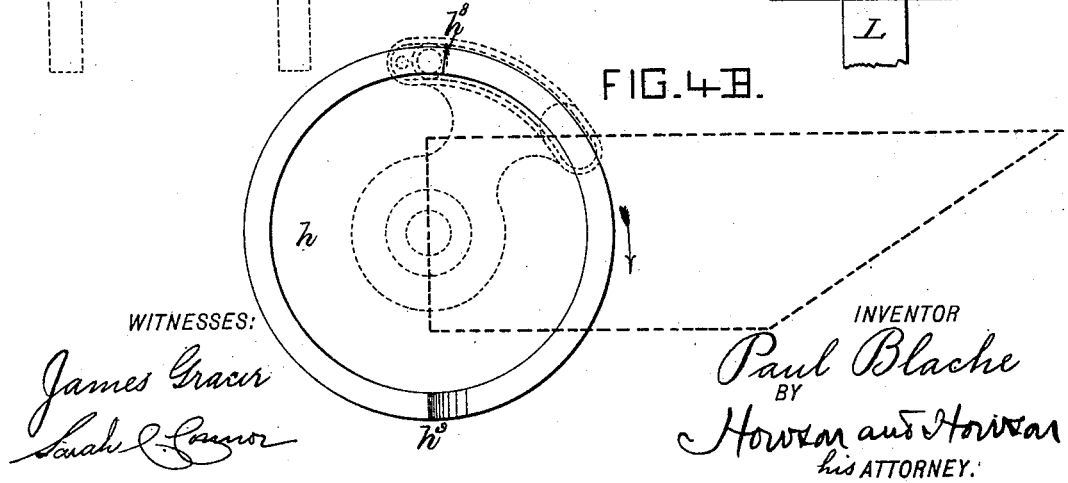
Figure 14:
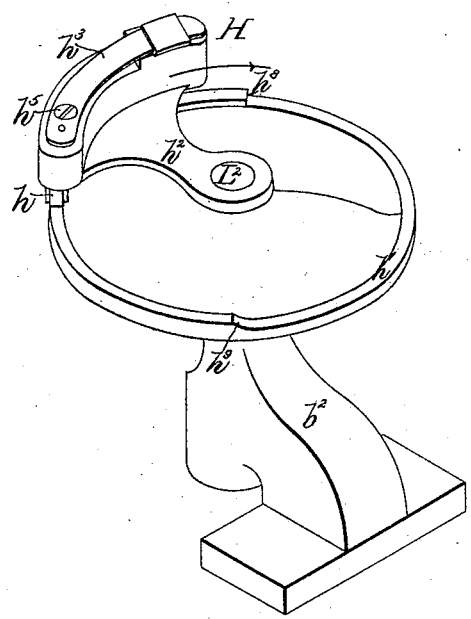
Figure 15:
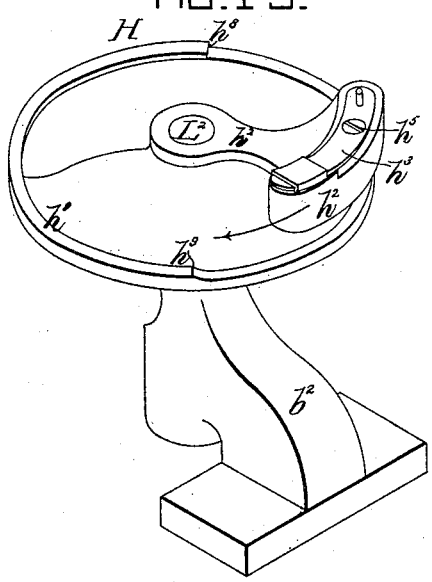

In the accompanying drawings, Figure 1 is a longitudinal elevation of the machine. Fig. 2 is a corresponding plan view, with the bobbin removed. Fig. 3 is a longitudinal section following the line 1—2 of Fig. 2. Figs. 4, 5 and 6 are transverse sections following respectively the lines 5—6, 7—8 and 3—4 of Fig. 2. Figs. $4^a$ and $4^b$ and $4^c$ are details of parts shown more particularly in Fig. 4. Fig. 7 is a horizontal section at the level of the line 9—10 of Fig. 1. Fig. 8 represents the development of the quantity of paper for the manufacture of two mouth pieces. Fig. 9 shows a mouth piece manufactured. Figs. 10, $10^a$ and $10^b$ are views drawn to an enlarged scale, of a detail of the machine. Fig. 11 is a front elevation; Fig. 12 a side elevation; and Fig. 13 a plan of part of the working mechanism. Figs. 14 and 15 are perspective views of a detail.

Similar letters refer to similar parts throughout the several views.

The paper intended for the making of these mouth pieces is wound into a bobbin or roll and this is mounted on a drum A furnished with a movable cheek $a$ (Figs. 1 and 5) which screws on to its boss and permits the closing on to bobbins of different breadths. By means of the spiral spring $a^5$ and an adjusting stud $a^4$, the drum itself may be displaced longitudinally upon its axle so that bobbins of different breadth may be always kept in the working axis of the machine. Further, the drum A is connected to a pulley $a$ in such manner that the pulley must rotate with the drum, and around the pulley $a'$ is passed a steel band $a^2$ forming a brake for the drum A. This band $a^2$ is connected by a spring to a stud $a^3$ which permits regulating the tension at will. The paper coming from the drum A passes on to a sector B (Fig. 1) which guides it and brings it between two drawing cylinders C and C'. These cylinders having an intermittent movement, as will be hereinafter seen at each revolution advance the amount of paper required for the formation of a mouth piece and bring it under the table D (Fig. 3). Knives E and E' (shown in Figs. 1 and 3, and in dotted lines in Fig. 2) operating once for two revolutions of the cylinders C and C', cut off the paper in such a manner as to form two mouth pieces $e\ e'\ e^2\ e^3$ and $e^2,\ e^3\ e^4\ e^5$ similar and diametrically opposed (Fig. 8). Two spring plates F and F' (Figs. 1, 6 and 7, and to an enlarged scale in Figs. 11, 12 and 13), push the first mouth piece $e\ e'\ e^2\ e^3$ and bring it into the position indicated by dotted lines (Fig. 2) thus entering its end $e$ into a nipper $g$ mounted on the plate G, as shown in Figs. 6, 10, $10^a$ and $10^b$. The plate G, loose on its axle $L^4$, has an intermittent movement of a quarter turn corresponding with each movement of the cylinders C, C'.

Referring more particularly to Fig. $10^a$, during a displacement of this plate G the first mouth piece is carried away from the table D in the direction of the arrow. The nippers $g$ are mounted in tubes $g^4$ which are in one with the plate G. By means of gearing $j'$ and $j'$, hereinafter explained the dippers $g$ have a rotary motion within the tubes $g^4$ beside their revolution around the axis $L^4$. The tubes $g^4$ are slit longitudinally as shown at $g^7,\ g^7$ to permit the introduction of the paper into the nippers $g$. When the plate G is moving, the nippers $g$ rotate and wind the paper around themselves inside the tubes $g^4$ as represented in Fig. $10^a$, the position 1 representing the starting point before the paper has begun to roll up, the position 2 representing the paper partially rolled up, and the position $g^6$ showing the mouth piece entirely rolled up. While the plate G is making a quarter turn the second mouth piece $e^2$ $e^3$ $e^4$ $e^5$ having been seized with a nipper H (as hereinafter explained), is carried around into the position previously occupied by the first mouth piece $e$ $e'$ $e^2$ $e^3$ before its parallel displacement by the spring plates F, F'. The nipper H then opens and the spring plates F, F' push this second mouth piece into the position indicated in dotted lines (Figs. 2, $10^a$ and $10^b$) and enter its point into another nipper $g$ which has now presented itself. The plate G carries away this second mouth piece as it did the first. During these two successive displacements of the plate G (each of them equal to one-fourth of a turn) the cylinders C and C' make two revolutions and cause the advance of the quantity of paper necessary for the formation of two new mouth pieces which are cut off and introduced into the nippers $g$ in a way identical with that of the first two. The nippers $g$ arrive successively at the position $g^6$ (Fig. 1) in rolling up their mouth pieces. In this position the mouth piece is entirely rolled up, and it is pushed off the nipper and introduced into the cigarette or into the cigarette tube, leaving the nipper $g$ ready to receive a new mouth piece, to be rolled up. The means for pushing the rolled up mouth piece off the nipper $g$ and out of the tube $g^4$ consist of a lever K (shown on a large scale by Figs. 11, 12 and 13) forked or notched at its outer end, and sockets $g^8$ around the nippers $g$. These sockets are movable longitudinally within the tubes $g^4$, and each is provided with a pin $g^9$ adapted to work in a slot $g^5$ in the tube $g^4$. As the tube $g^4$ nears the position $g^6$, (Figs. 1 and $10^a$) the pin $g^9$ enters the notch or fork of the lever K. At the end of each quarter revolution of the plate G, the lever K is moved from the upright position shown in dotted lines in Fig. 12, to the position shown in full lines in Figs. 6 and 12. As the lever K moves outward it carries the socket $g^8$ with it (by means of the pin $g^9$ in its notch), and this socket forces ahead of it and out of the tube $g^4$, the rolled up mouth piece (Figs. 6 and 10).

The machine receives its movement by a shaft L (Figs. 1, 2, 4, 7, 11, 12 and 13) upon which is mounted a plate $l$ (Figs. 2, 4 and 7) carrying two friction rollers $l'$ and $l^2$ diametrically opposite each other. These friction rollers engage successively in the four notches of a Maltese cross M, (Figs. 1, 2, 4 and 7) each roller causing the Maltese cross to make a quarter revolution. This Maltese cross is keyed on a shaft L' arranged parallel to the shaft L, and supported by the bearings $b'$, $b'$. Thus the shaft L revolves twice while the shaft L' revolves once. On this Maltese cross is fixed a gear wheel $m$ which gears with a wheel $g^2$ mounted on the plate G (Figs. 1, 2 and 10). This plate G is therefore displaced to the extent of a quarter turn at each half revolution of the shaft L, because the said cross has four notches or recesses and the plate $l$ possesses two rollers.

On the shaft L' of the cross M is keyed a bevel wheel $m'$ (Fig. 4) actuating the gear $n$, of half the diameter of the wheel $m'$, and causing it to describe (as also the nipper H) half a turn for each quarter revolution of the shaft L'. The gear $n$ and the nipper H are mounted on the same shaft $L^2$, supported by the bearing $b^2$ bolted on the bed or table T of the machine. The toothed wheel $m$ also actuates the gear wheel $c$ keyed on the shaft $L^3$ which shaft is supported by bearings $b^2$, $b^3$, bolted on the bed T of the machine, Figs. 1, 2 and 5. Keyed on this same shaft $L^3$ is the gear wheel $c'$ actuating the gear $c^2$ on the shaft of the cylinder C', which gear $c^2$, in turn actuates the gear $c^3$ on the shaft of the cylinder C. The gear wheels $c$, $c'$, $c^2$, $c^3$ are so proportioned that for each quarter turn of the shaft L', the drawing cylinders C, C' make a complete revolution. In short, for a displacement of a quarter turn of the Maltese cross M, I cause the plate G to make a quarter turn, the nipper H half a turn and the cylinders C and C' a complete turn.

The nipper H, Figs. 4, $4^a$ and 7 14 and 15 consists of the part $h^2$ mounted on the shaft $L^2$, and a flexible metallic blade $h^3$. This spring blade $h^3$ is mounted on a shaft $h^5$ which passes through an opening in the part $h^2$, and which carries a roller $h$. This roller is pressed by a spring $h^6$ against a fixed cam $h'$ (Figs. $4^a$, $4^b$ and $4^c$) and a projection $h^7$ on the bearings for the roller in connection with the abrupt descent $h^8$ on the cam $h'$, cause the quick closing of the nipper on the paper.

Fig. 4 represents the contour of the cam $h'$ as it would appear straightened out.

Fig. $4^b$ represents the nipper in dotted lines as it is just about to close down on the paper. When the nipper has made a half turn on its axis $L^2$, and brought the second mouth-piece to the former position of the first mouth-piece, the roller $h$ rides up on the incline $h^9$ of the cam $h'$ to open the nipper to leave the paper.

Upon the shaft L, supported by the bearings $b$ are mounted two cams $e$ and $f$. The first, $e$, actuates a lever $e^2$ (Figs. 1, 2 and 7) which actuating the axle $e^3$ supported by the table D, gives to the knives E and E' the movement for cutting the paper. These knives or cutters are mounted on the said shaft $e^3$ and participating in all its movement, produce the cut in combination with counter-knives fixed on the table D under which the paper passes. The second cam $f$ actuates the lever $f'$ which carries with it the axle H' upon which it is pinned. This shaft H' by means of the lever $k$ and the link $k'$ (Figs. 1, 6, 7, 11, 12 and 13) communicates the movement to the lever K which pushes the mouth-piece out of its nipper $g$. The plates F, F' are carried by a tube or sleeve $f^3$ mounted upon the shaft H'. A spring $r$ attached to the support S of the table D, tends to act upon the tube $f^3$ to cause the spring plates F, F' to push the mouth-piece into the nipper $g$, as before explained, while the shaft H' brings the spring plates F and F' back to their first position by means of the pin $f^2$ engaged in a circular slit $f^4$ made in the tube $f^3$.

On the nipper $g$ of the plate G are mounted the pinions $g'$ (Figs. 6 and 10) gearing with a wheel $j$ one with the stationary axle $L^4$ mounted in the support S' bolted on the bed T of the machine. When the plate G is rotated by the wheel $g^2$ the nippers $g$ turn and thus roll their mouth-pieces around them within tubes $g^4$.

It is understood that I reserve the right of modifying my apparatus in its various details of construction, also of applying it to all machines for making cigarettes or the paper tubes which are to form these cigarettes.

I claim as my invention—

1. In a machine for forming paper mouth-pieces for cigarettes, the combination of a drum A for the roll of paper, a guide B for the paper drawing rollers C, C', a table D and knives E, E', with a rotating nipper H, spring plates F, F', an intermittently rotating plate G, provided with rolling up nippers $g$, and a lever K, all substantially as and for the purposes set forth.

2. In a machine for forming paper mouth-pieces for cigarettes, the combination of drawing cylinders C, C', with a table D and knives E, E' to cut simultaneously two pieces of paper diametrically opposed, and a nipper H actuated by a cam $h$ to carry the second piece into the position previously occupied by the first piece, substantially as set forth.

3. In machines for making paper mouth-pieces for cigarettes, the combination of rotary nippers $g$, with spring plates F, F', to introduce the mouth pieces into nippers $g$, substantially as set forth.

4. In machines for making paper mouth pieces for cigarettes, the combination of an intermittently rotating plate G carrying rotary rolling up nippers $g$, sockets $g^8$ provided with pins $g^9$, with a lever K having its free end provided with a notch to engage successively the pins $g^9$ of the sockets $g^8$, all substantially as and for the purposes set forth.

5. In machines for making paper mouth pieces for cigarettes, the combination of an intermittently rotating plate G provided with tubes $g^4$ having rotary rolling up nippers $g$ and sockets $g^8$ provided with pins $g^9$, the said tubes having slots $G^5$ in which the pins $g^9$ work, with a lever K provided with a notch in which the pins $g^9$ successively engage, and mechanism for actuating the lever K, all substantially as and for the purposes set forth.

In testimony whereof I have signed my name to this specification in the presence of two subscribing witnesses.

PAUL BLACHE.

Witnesses:
LÉON FRANCKENS,
ROBT. M. HOOPER.